United States Patent
Baracca et al.

(10) Patent No.: US 12,404,899 B2
(45) Date of Patent: Sep. 2, 2025

(54) BEARING UNIT WITH ROLLING BODIES

(71) Applicant: AKTIEBOLAGET SKF, Götenborg (SE)

(72) Inventors: Fausto Baracca, Massa (IT); Andrea A. Bertolini, Carrara (IT); Fabio Cavacece, Rome (IT)

(73) Assignee: Aktiebolaget SKF, Gothenburg (SE)

( * ) Notice: Subject to any disclaimer, the term of this patent is extended or adjusted under 35 U.S.C. 154(b) by 124 days.

(21) Appl. No.: 18/219,133

(22) Filed: Jul. 7, 2023

(65) Prior Publication Data
US 2024/0019001 A1 Jan. 18, 2024

(30) Foreign Application Priority Data
Jul. 15, 2022 (IT) .......................... 102022000014851

(51) Int. Cl.
*F16C 33/78* (2006.01)
*F16C 19/06* (2006.01)

(52) U.S. Cl.
CPC ............ *F16C 33/783* (2013.01); *F16C 19/06* (2013.01); *F16C 33/782* (2013.01)

(58) Field of Classification Search
CPC .............. F16C 33/783; F16C 33/7823; F16C 33/7876; F16C 33/7856; F16C 33/782; F16C 19/06; F16C 33/768; F16C 33/7806; F16C 33/583; F16C 33/7853
See application file for complete search history.

(56) References Cited

U.S. PATENT DOCUMENTS

| 4,526,485 A | 7/1985 | Frase et al. | |
|---|---|---|---|
| 2008/0019624 A1* | 1/2008 | Kubo | F16J 15/3264 384/147 |
| 2009/0180721 A1 | 7/2009 | Barbera et al. | |
| 2011/0262063 A1* | 10/2011 | Dittmar | F16J 15/3276 384/147 |

FOREIGN PATENT DOCUMENTS

| EP | 2990674 | 3/2016 |
|---|---|---|
| JP | 2002349591 | 12/2002 |
| JP | 3991190 | 10/2007 |

OTHER PUBLICATIONS

International Search Report for corresponding Italy Patent Application No. 102022000014851 dated Feb. 11, 2023.

* cited by examiner

*Primary Examiner* — John Olszewski
*Assistant Examiner* — Aimee Tran Nguyen
(74) *Attorney, Agent, or Firm* — Stinson LLP

(57) ABSTRACT

A bearing unit includes a radially outer ring having seats formed in a radially inner surface thereof, a radially inner ring, a row of rolling bodies, and at least one sealing device interposed between the rings. Each sealing device includes a shaped shield, an elastomer coating overmolded on the shaped shield, and an anchorage formed on the elastomer coating. The anchorage includes a radially external anchoring lip received by the seat of the radially outer ring that includes a root portion and a projection distal to the root portion. The anchorage also includes an annular cavity formed on a radially internal side thereof, where an axial length of the annular cavity is greater than an axial length of the projection and the anchoring lip is flexed radially inward and at least partially fills the annular cavity.

24 Claims, 6 Drawing Sheets

Fig. 5 – Det. B

BEARING UNIT WITH ROLLING BODIES

CROSS-REFERENCE RELATED APPLICATIONS

This application is based on and claims priority to Italian Patent Application No. 102022000014851 filed on Jul. 15, 2022, under 35 U.S.C. § 119, the disclosure of which is incorporated herein by reference in its entirety.

FIELD

The present disclosure relates to a bearing unit with rolling bodies, having an optimized anchorage for the sealing device. Such a bearing unit is suitable in particular for use in the food and beverage (F&B) industry.

BRIEF DESCRIPTION OF THE DRAWINGS

The disclosure will now be described with reference to the attached drawings, which show some exemplary embodiments of the bearing unit, in which.

DETAILED DESCRIPTION

Figure 1:
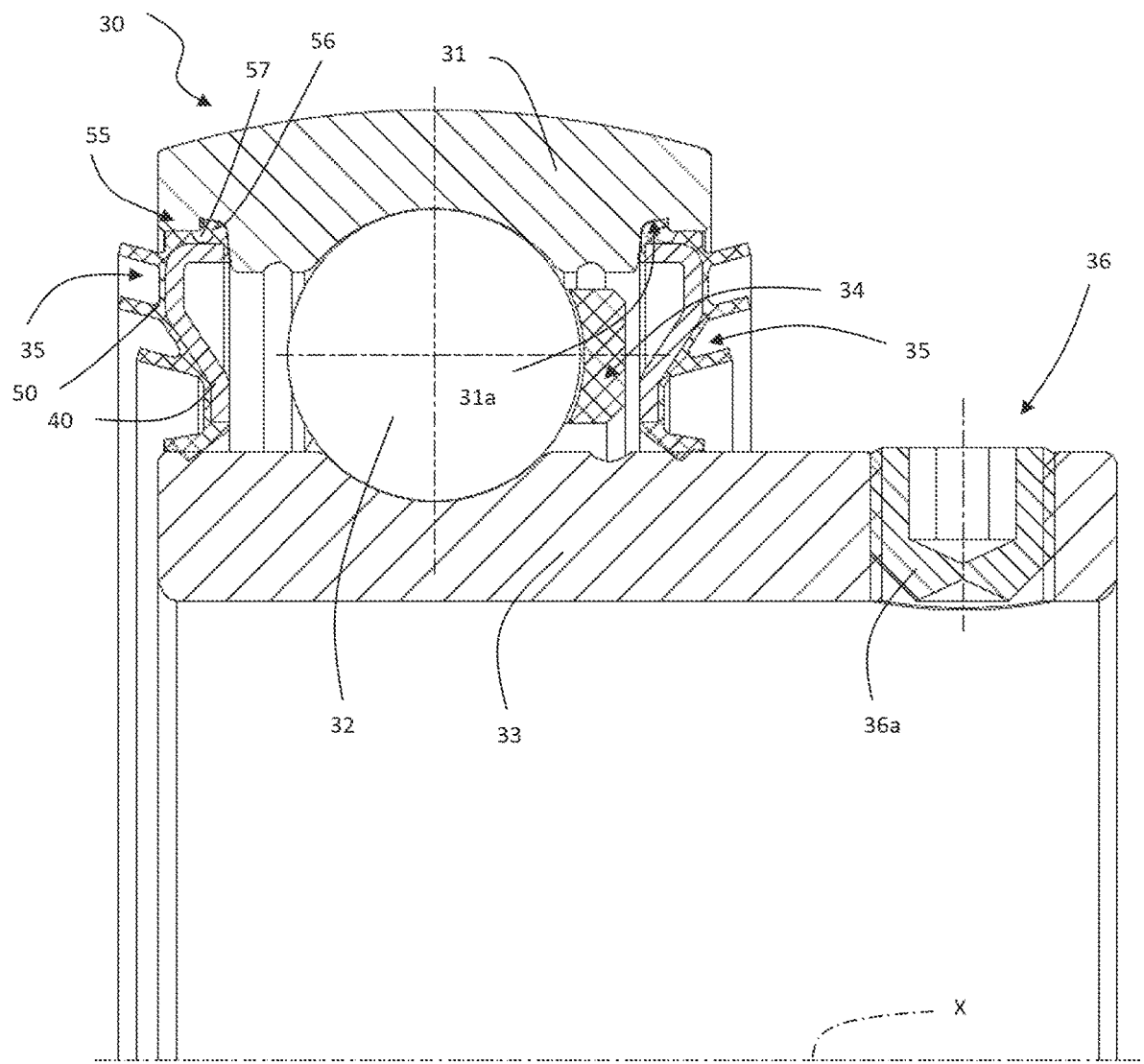
FIG. 1 illustrates a cross section of a bearing unit according to exemplary embodiments of the present disclosure.

Bearing units having rolling elements may be used to allow relative movement between one component or group and another component or group. Bearing units generally may include a first component, for example a radially outer ring, which may be secured to a rotary element, and a second component, for example a radially inner ring, which may be secured to a stationary element. Rotation of one ring with respect to the other is made possible by a plurality of rolling elements positioned between cylindrical surfaces of each component, such surfaces often referred to as raceways. The rolling elements may be balls, cylindrical or conical rollers, needle rollers, and similar rolling elements.

Sealing devices help to protect a bearing unit from external contaminants and to create a seal to retain lubricant inside an internal environment of the bearing unit. Sealing devices may be made up of a shield mounted by interference in a seat of the first or second component of the bearing unit. The shaped shield may include an elastomer coating with one or more sealing lips and a protrusion. The sealing lips may, in use, make frictional contact with other components of the bearing unit. The sealing lips may also be in a "guttering" arrangement, in other words axially external and substantially parallel to one another, so as to create a "labyrinth" seal, for example, with a casing containing the bearing unit. Such sealing devices may be very efficient both from a functional point of view and in terms of reliability, throughout the entire life of the bearing unit.

One of the main drawbacks of known sealing device relates to assembling the sealing device in the bearing unit. To be specific, when the sealing device is inserted in the seat in the radially outer ring, the protrusion of the elastomer coating may become highly compressed and, not having space needed to adapt properly in the seat, gives rise to high tension forces that risk ejecting the sealing device from the seat.

There is therefore a need to define a bearing unit with a sealing system that does not have the abovementioned drawbacks.

With reference to the figures, a bearing unit 30 may include a radially outer ring 31, which may be stationary or rotatable about a central axis of rotation X of bearing unit 30, a radially inner ring 33, which may be rotatable about central axis X of bearing unit 30 or stationary, a row of rolling elements 32, e.g., balls, interposed between radially outer ring 31 and radially inner ring 33, a cage 34 for holding retaining rolling elements 32 in position, and a securing device 36 for securing radially inner ring 33 a machine shaft, e.g., a pair of grub screws 36a.

Throughout the present description and in the claims, terms and expressions indicating positions and orientations, such as "radial" and "axial", are to be understood with reference to central axis of rotation X of bearing unit 30.

Reference sign 32 may be used to refer to individual rolling elements 32 and a row of rolling elements 32.

In some embodiments, bearing unit 30 may include sealing devices 35 for sealing off bearing unit 30 from an external environment.

In some embodiments, sealing devices 35 may be interposed between radially inner ring 33 and radially outer ring 31. Sealing devices 35 may cooperate with radially internal cylindrical surfaces 31b of radially outer ring 31 and may be anchored in seats 31a of radially outer ring 31 in an assembled configuration, i.e., during use, of bearing unit 30. Seats 31a may be radially internal with respect to radially outer ring 31 and axially external with respect to cylindrical surfaces 31b. Moreover, seats 31a may have a toroidal shape and be recessed in a radially external direction with respect to cylindrical surfaces 31b.

Figure 4:
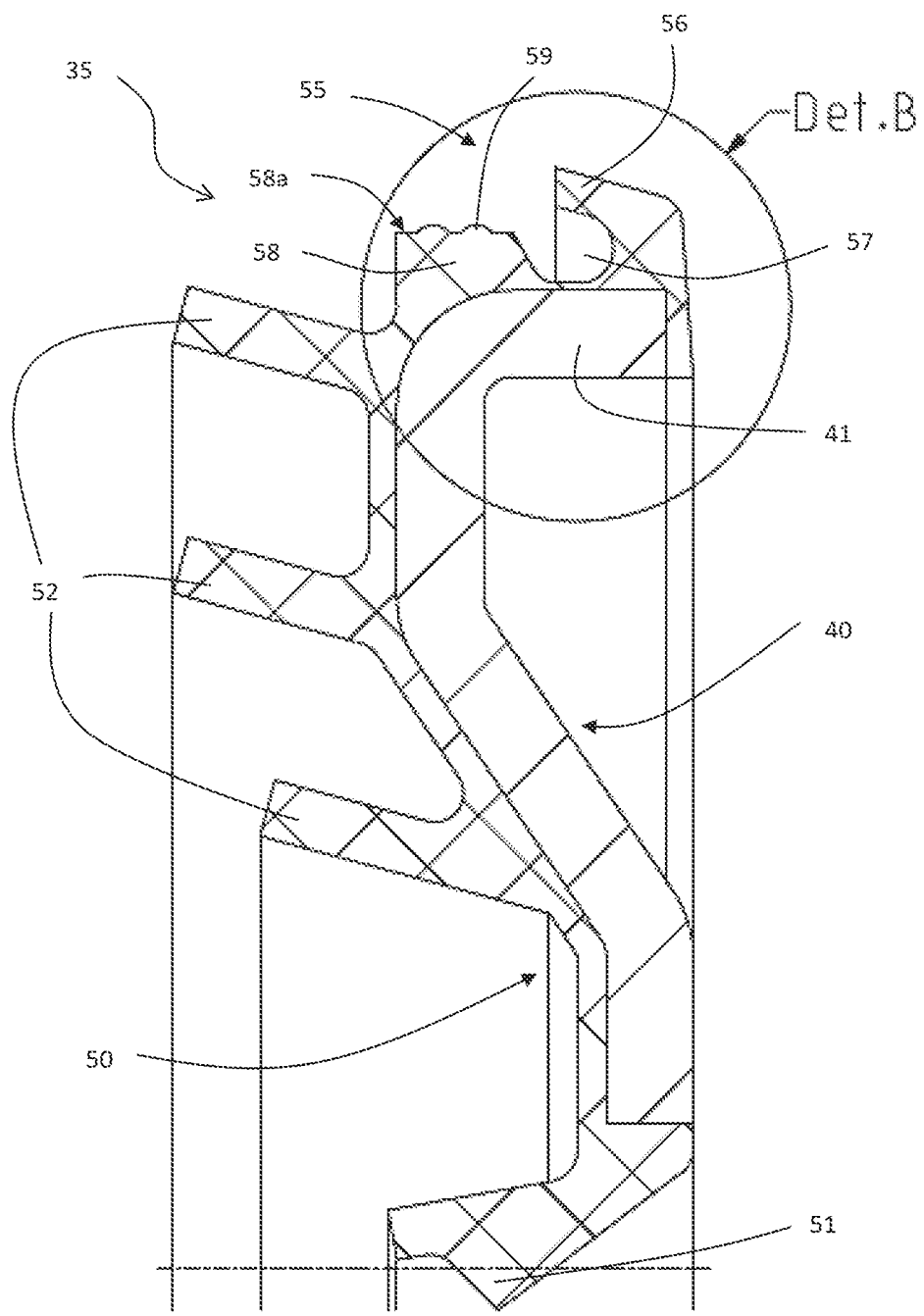
FIG. 4 illustrates an enlarged view of the bearing unit of FIG. 1 according to exemplary embodiments of the present disclosure.

As illustrated in FIG. 4, some embodiments of a sealing device 35 may include a shaped shield 40, which may be made of a metallic material, and an elastomer coating 50 overmolded on shaped shield 40.

In some embodiments, shaped shield 40 may include a radially outer cylindrical portion 41 coaxial with axis X and a flange portion 41b that may be rigidly secured to cylindrical portion 41. In some embodiments, flange portion 41b may extend radially inward and transverse to axis X from cylindrical portion 41.

In some embodiments, elastomer coating 50 may include a radially internal contacting lip 51, a plurality of non-contacting lips 52 forming a labyrinth seal with a casing (not illustrated) that houses bearing unit 30 during use, and a radially outer anchorage 55 rigidly secured to cylindrical portion 41 of shaped shield 40. In some embodiments, contacting lip 51 may create a seal with radially inner ring 33 by frictional contact therewith. In some embodiments, non-contacting lips 52 may extend in an axially external direction, may be parallel or substantially parallel to one another, and may be arranged radially along a radial length of shield 40. In some embodiments, sealing device may be attached to seat 31a of outer ring 31 by anchorage 55.

Figure 5:
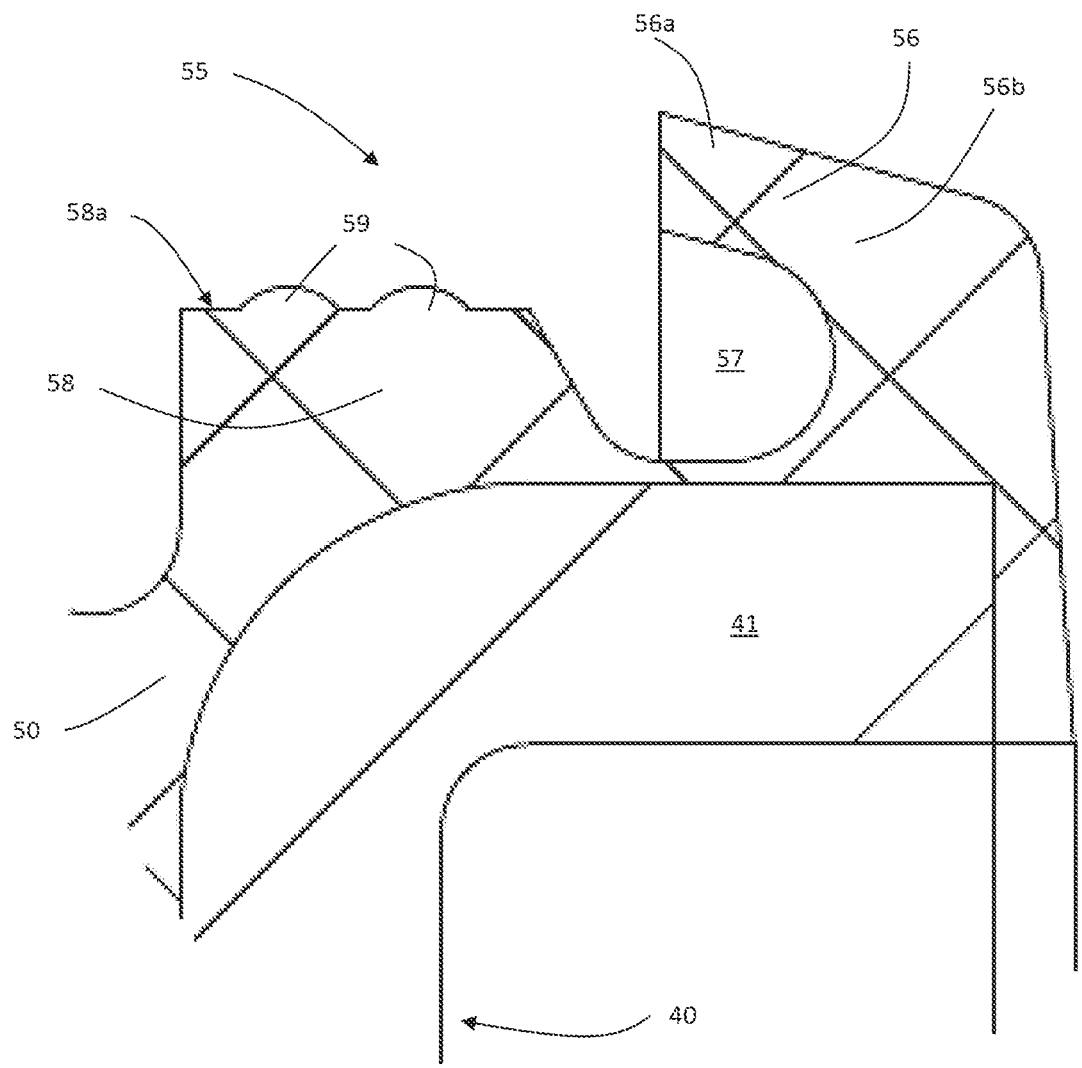
FIGS. 5, 6 and 7 show an enlarged view of the portion of the bearing unit of FIG. 4 according to exemplary embodiments of the present disclosure.

As illustrated by FIG. 5, in some embodiments, anchorage 55 may include a radially external anchoring lip 56, —a annular cavity 57 formed radially internal to anchoring lip 56, a cylindrical portion 58 formed in elastomer coating 50 and axially external to annular cavity 57. In an assembled configuration, i.e., during use, of bearing unit 30, cylindrical portion 58 may be axially external to seat 31a of radially outer ring 31. In some embodiments, cylindrical portion 58 may include a radially external cylindrical surface 58a that cooperates with cylindrical surface 31b during use and which advantageously presents protrusions 59. In some embodiments, radially external anchoring lip 56 may fit in seat 31a of radially outer ring 31 in an assembled configuration of bearing unit 30.

Figure 2:
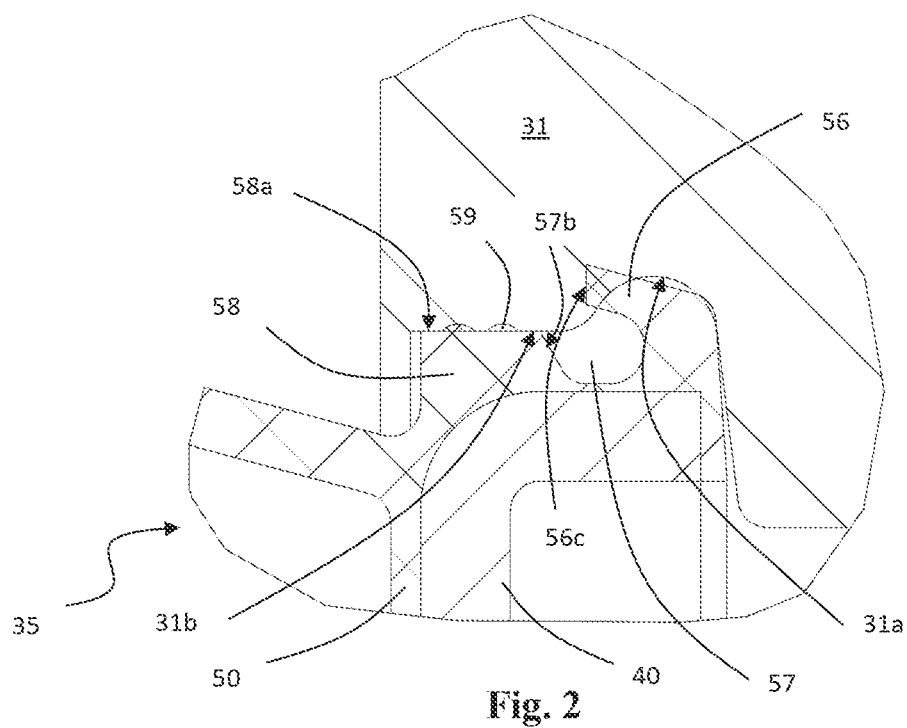
FIG. 2 illustrates an enlarged view of a portion of the bearing unit of FIG. 1 with a sealing device in a non-deformed configuration according to exemplary embodiments of the present disclosure.
Figure 3:
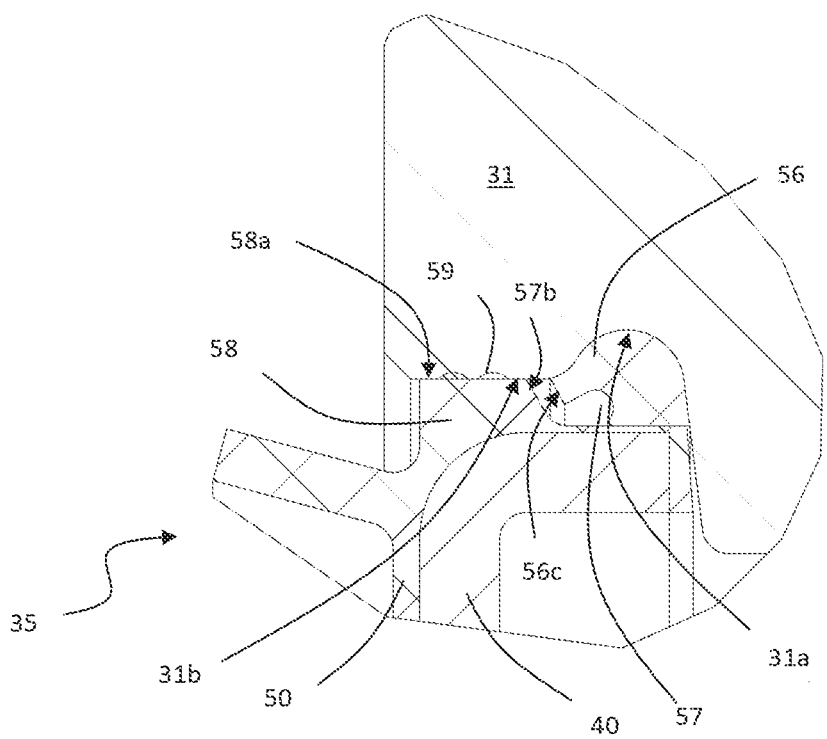
FIG. 3 illustrates an enlarged view of the portion of the bearing unit of FIG. 1 in with a sealing device in a deformed configuration according to exemplary embodiments of the present disclosure.

FIGS. 2 and 3, respectively, illustrate embodiments of an anchorage 55 in a non-deformed configuration, i.e., before assembly of bearing unit 30, and in a deformed configuration, i.e., after assembly of bearing unit 30. In a non-deformed configuration of anchorage 55, anchoring lip 56 may protrude in a radially and axially external direction. In a deformed configuration of anchorage 55, anchoring lip 56 may be bent inward to at least partially occupy annular cavity 57.

Figure 7:
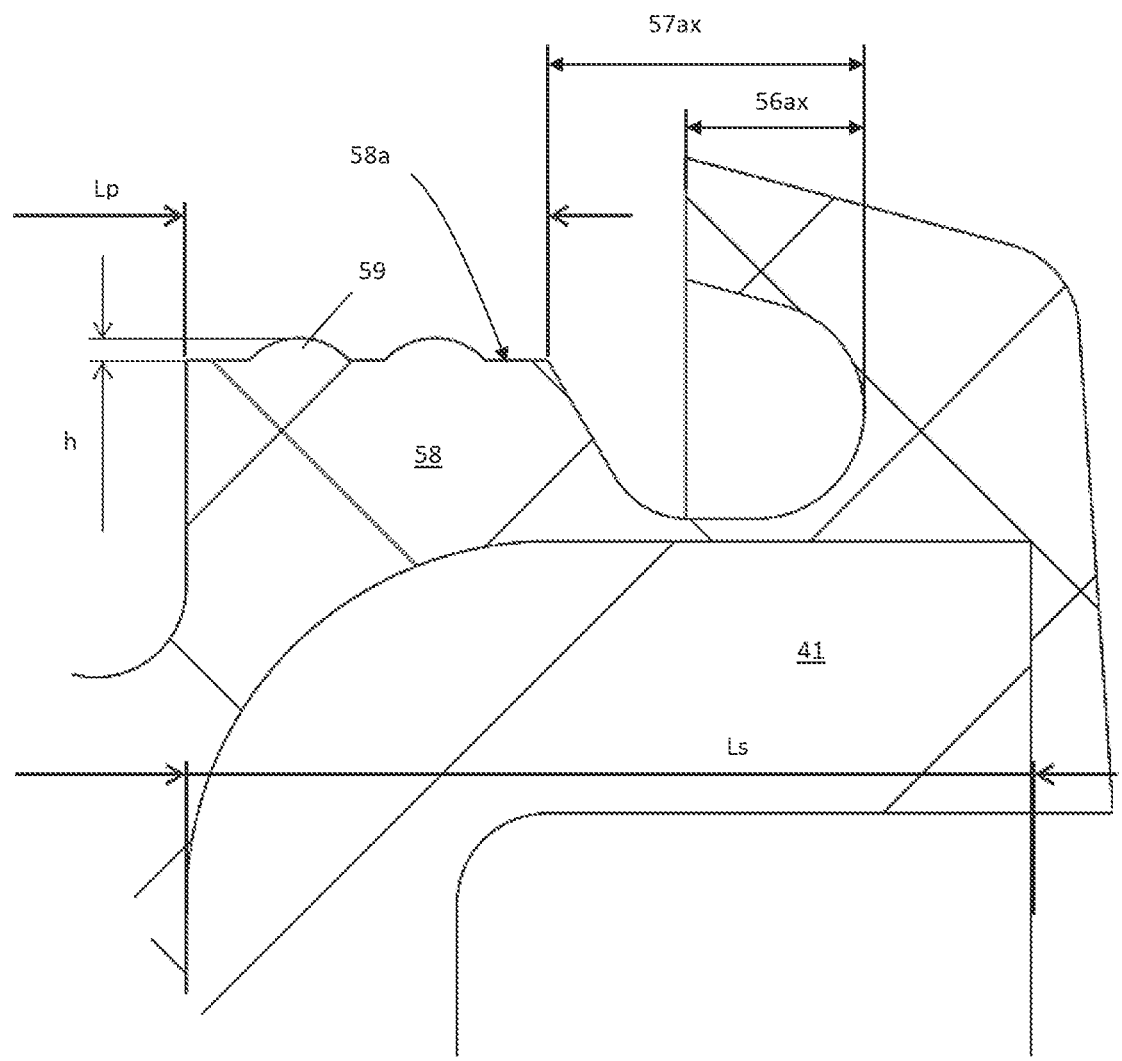

In some embodiments, anchoring lip 56 may include a root portion 56b and a distal portion 56a that is more flexible and thinner than root portion 56b. Moreover, projection 56ax of anchoring lip 56 (see FIG. 7) may be smaller than an axial length 57ax of annular cavity 57. Lastly, anchoring lip 56 may include an edge axially external 56c defined at an end of projection 56ax facing cylindrical portion 58. In a deformed configuration, i.e., during use, root portion 56b of anchoring lip 56 may deform such that axially external edge 56c may be parallel to an inclined surface 57b that defines an axially external surface of annular cavity 57.

By bending inward in an assembled configuration as described above, tension forces applied to anchoring lip 56 during use of bearing unit 30 are reduced, which also reduces the likelihood that anchoring lip 56 is ejected from its position within seat 31a.

In some embodiments, in an assembled configuration of bearing unit 30, protrusions 59 on cylindrical surface 58a may cause interference between cylindrical surface 58a of cylindrical portion 58 and cylindrical surface 31b of radially outer ring 31. This interference helps improve the stability of sealing device 35 in bearing unit 30 by preventing rotation of sealing device 35 with respect to radially outer ring 31.

It will be understood that, in order to ensure high efficiency of anchorage 55, the following dimensions are particularly advantageous and help ensure a proper seal of bearing unit 30 from the external environment and to ensure that sealing device 35 remains in place during use.

Figure 6:
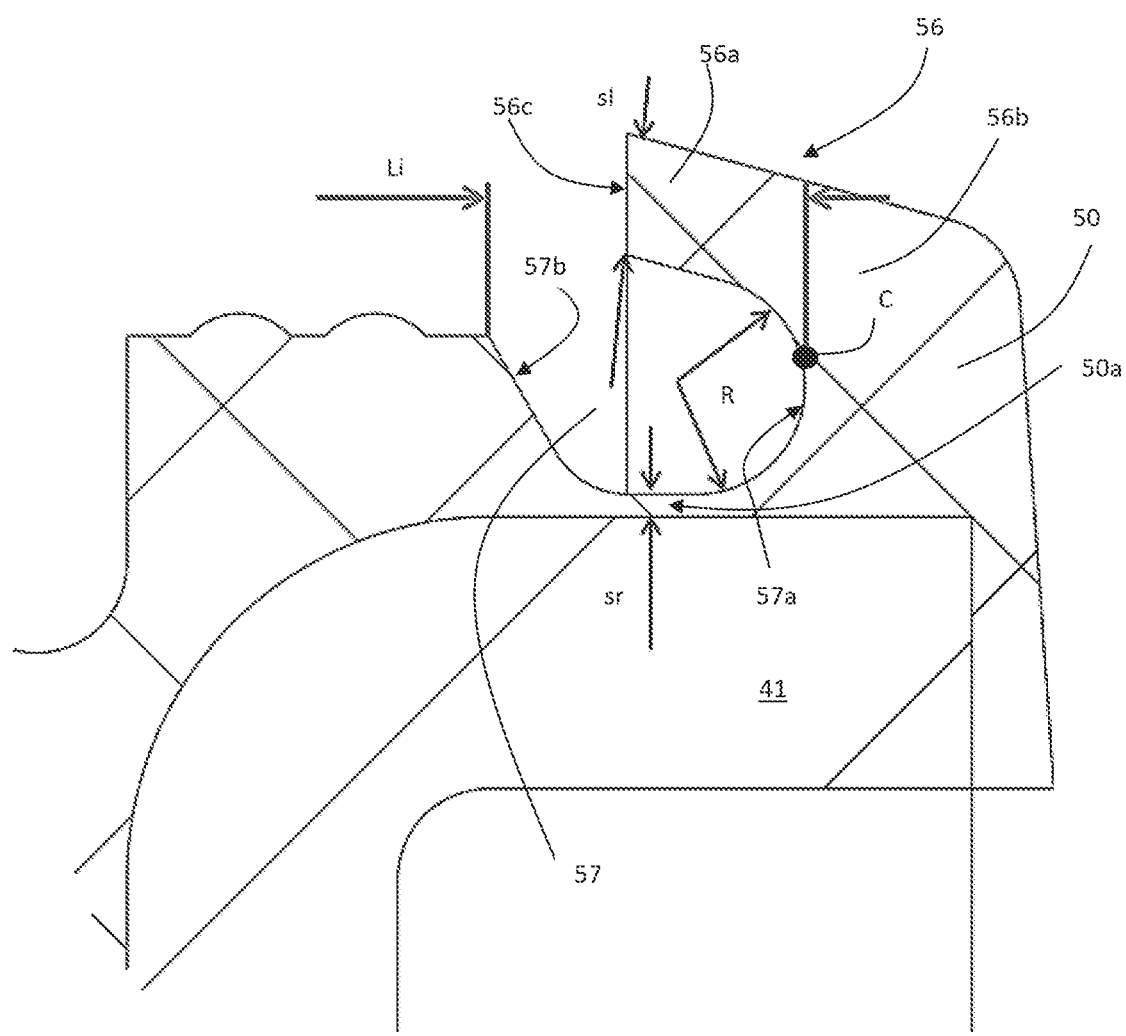

In particular, as illustrated by FIG. 6, exemplary embodiments of sealing device 35 may include an anchoring lip 56 that may bend within annular cavity 57 in an assembled configuration of bearing unit 30. In order to ensure that anchoring lip 56 does not interfere with any other elements of anchorage 55 and elastomer coating 50. In particular, in order to avoid interference between a cylindrical portion 50a of anchorage 55, a thickness sr of cylindrical portion 50a may be between 0.15 mm and 0.20 mm. A thickness below 0.15 mm may compromise the overall overmolding of elastomer coating 50, while a thickness greater than 0.20 mm may result in interference between edge 56c of anchoring lip 56 and cylindrical portion 50a of elastomer coating 50.

Furthermore, in some embodiments, a radius R of an axially internal surface 57a of annular cavity 57 may be equal to a thickness sl of anchoring lip 56. In some embodiments, both radius R of internal surface 57a and thickness sl of anchoring lip 56 may be between 0.75 mm and 1.25 mm.

In some embodiments, internal surface 57a may be measured from axially external surface 57b and radial projection 26a.

In some embodiments, a volume of annular cavity 57 may be at least 25% greater than volume of anchoring lip 56. The volume of anchoring lip 56 may be calculated from a center of rotation C (see FIG. 6) of anchoring lip 56, representing a theoretical point about which anchoring lip 56 deforms, in the axially external direction.

In some embodiments, anchorage 55 may include at least two protrusions 59 each having a radial height h of between to ensure stability of sealing device 35 in bearing unit 30 and prevent elastomer coating 50 from rotating with respect to bearing unit 30 during use. Such interference ensures that elastomer coating 50 does not rotate in spite of the friction caused by shaped shield 40. In some embodiments, a number of protrusions may be more than two as long as a distance between consecutive protrusions is at least equal to height h of each protrusion.

In some embodiments, an axial length Lp of cylindrical portion 58 of elastomer coating 50 may be about half an axial length Ls of cylindrical portion 41 of shaped shield 40. This ensures that elastomer adheres to cylindrical portion 41 sufficiently to withstand the friction caused by shaped shield 40. This axial length Lp ensures that shaped shield 40 may be positioned in a vertical position, thus preventing the "umbrella" effect that can occur when assembling shaped shield 40.

In sum and without limitation, advantages of exemplary embodiments of a sealing device 35 described herein include the improved anchoring of sealing device 35 to radially outer ring 31 by way of anchorage 55 that assist with automatic assembly of sealing device 35, and improved resistance to rotation relative to radially outer ring 31 that can result in the ejection of sealing device 35 from bearing unit 30.

In addition to the embodiments of the disclosure as described above, it is to be understood that there are numerous other variants. It is also to be understood that said embodiments are solely exemplary and do not limit the scope of the disclosure, its applications, or its possible configurations. On the contrary, although the above description enables those skilled in the art to apply the present disclosure in at least one exemplary configuration, it is to be understood that numerous variations of the described components may be devised, without thereby departing from the scope of the disclosure as defined in the appended claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

The invention claimed is:

1. A bearing unit comprising:
   a radially outer ring comprising:
     at least one seat formed in a radially inner surface of the outer ring; and
     at least one cylindrical surface of the radially inner surface, each cylindrical surface being adjacent to a corresponding seat;
   a radially inner ring;
   a row of rolling bodies interposed between the radially outer ring and the radially inner ring;
   at least one sealing device interposed between the radially inner ring and the radially outer ring and comprising:
     a shaped shield comprising a metallic material;
     an elastomer coating overmolded on the shaped shield; and
     an anchorage formed on the elastomer coating and comprising:
       a radially external anchoring lip received by the seat of the radially outer ring and comprising:
         a root portion; and
         a projection distal to the root portion and comprising a flexibility and a thickness that is less than a flexibility and a thickness of the root portion;
       an annular cavity formed on a radially internal side of the anchoring lip, and
       a cylindrical portion comprising a radially external cylindrical surface, the cylindrical portion being axially spaced apart from the anchoring lip, the radially external cylindrical surface cooperating with a corresponding radially internal cylindrical surface of the at least one radially internal cylindrical surface of the radially outer ring;
     wherein an axial length of the annular cavity is greater than an axial length of the projection,
     the anchoring lip is flexed radially inward and at least partially fills the annular cavity.

2. The bearing unit of claim 1, wherein the anchorage further comprises
   one or more protrusions formed on the radially external cylindrical surface,
   the one or more protrusions being in an interference fit with the corresponding radially internal cylindrical surface of the radially outer ring.

3. The bearing unit of claim 2, wherein the anchorage further comprises a second cylindrical portion located at a radially internal end of the annular cavity comprising a thickness between 0.15 mm and 0.20 mm.

4. The bearing unit of claim 3, wherein a radius of an axially internal surface of the annular cavity is equal to a thickness of the anchoring lip.

5. The bearing unit of claim 4, wherein the radius of the axially internal surface of the annular cavity and the thickness of the anchoring lip comprise between 0.75 mm and 1.25 mm.

6. The bearing unit of claim 2, wherein a volume of the annular cavity is at least 25% greater than a volume of the anchoring lip.

7. The bearing unit of claim 6, wherein the one or more protrusions comprises at least two protrusions.

8. The bearing unit of claim 7, wherein a height of the one or more protrusions is between 0.15 mm and 0.30 mm.

9. The bearing unit of claim 8, wherein a radial distance between two adjacent protrusions is greater than or equal to the height of each protrusion.

10. The bearing unit of claim 2, wherein an axial length of the cylindrical portion of the anchorage is equal to half an axial length of a cylindrical portion of the shaped shield.

11. The bearing unit of claim 1, wherein the cylindrical portion is axially external of the anchoring lip.

12. The bearing unit of claim 11, wherein the cylindrical portion bounds an axially external side of the cavity.

13. A sealing device for a bearing unit comprising:
    a shaped shield comprising a metallic material;
    an elastomer coating overmolded on the shaped shield; and
    an anchorage formed on the elastomer coating and comprising:
      a radially outer anchoring lip configured to be received by a seat of a radially outer ring and comprising:
        a root portion; and
        a projection distal to the root portion and comprising a flexibility and a thickness that is less than a flexibility and a thickness of the root portion;
      an annular cavity formed on a radially inner side of the anchoring lip, and
      a cylindrical portion comprising a radially outer cylindrical surface, the cylindrical portion being axially spaced apart from the anchoring lip, the radially outer cylindrical surface being configured to cooperate with a corresponding radially internal cylindrical surface of the radially outer ring;
    wherein an axial length of the annular cavity is greater than an axial length of the projection, and the anchoring lip is configured to deform and bend in a radially inward direction to at least partially fill the annular cavity when assembled in the bearing unit.

14. The sealing device of claim 13, wherein the anchorage further comprises
one or more protrusions formed on the radially outer cylindrical surface of the anchorage,
the one or more protrusions being configured to create an interference fit with the corresponding cylindrical surface of the radially outer ring.

15. The sealing device of claim 14, wherein the anchorage further comprises a second cylindrical portion located at a radially inner end of the annular cavity comprising a thickness between 0.15 mm and 0.20 mm.

16. The sealing device of claim 15, wherein a radius of an axially internal surface of the annular cavity is equal to a thickness of the anchoring lip.

17. The sealing device of claim 16, wherein the radius of the axially internal surface of the annular cavity and the thickness of the anchoring lip comprise between 0.75 mm and 1.25 mm.

18. The sealing device of claim 14, wherein a volume of the annular cavity is at least 25% greater than a volume of the anchoring lip.

19. The sealing device of claim 18, wherein the one or more protrusions comprises at least two protrusions.

20. The sealing device of claim 19, wherein a height of the protrusions is between 0.15 mm and 0.30 mm.

21. The sealing device of claim 20, wherein a radial distance between two adjacent protrusions is greater than or equal to the height of each protrusion.

22. The sealing device of claim 14, wherein an axial length of the cylindrical portion of the anchorage is equal to half an axial length of a cylindrical portion of the shaped shield.

23. The sealing device of claim 13, wherein the cylindrical portion is axially external of the anchoring lip.

24. The sealing device of claim 23, wherein the cylindrical portion bounds an axially external side of the cavity.

* * * * *